United States Patent [19]

Orlando et al.

[11] Patent Number: 4,485,959

[45] Date of Patent: Dec. 4, 1984

[54] MEANS FOR WELDING INTERCELL CONNECTIONS

[75] Inventors: Daniel Orlando, New Berlin, Wis.; David L. Lund, Minneapolis; Glenn R. Waber, St. Paul, both of Minn.

[73] Assignee: GNB Batteries Inc., Mendota Heights, Minn.

[21] Appl. No.: 378,277

[22] Filed: May 14, 1982

[51] Int. Cl.³ .............................................. H01M 2/24
[52] U.S. Cl. ..................................... 228/102; 29/623.1; 29/731; 219/80; 219/86.24; 228/7; 228/10; 228/58
[58] Field of Search .................... 228/7, 9, 10, 58, 102, 228/901; 219/80, 86.22, 86.24; 29/730, 731, 623.1; 429/160

[56] References Cited

U.S. PATENT DOCUMENTS

| | | | |
|---|---|---|---|
| 3,313,658 | 4/1967 | Sabatino et al. | 136/134 |
| 3,388,005 | 6/1968 | Hahn et al. | 136/134 |
| 3,441,448 | 4/1969 | Hayward et al. | 136/176 |
| 3,444,920 | 5/1969 | McAlpine et al. | 164/108 |
| 3,508,318 | 4/1970 | Chingenpeel et al. | 29/204 |
| 3,515,597 | 6/1970 | Barnes et al. | 136/134 |
| 3,518,127 | 6/1970 | Aronson | 429/160 |
| 3,547,183 | 12/1970 | Clingenpeel et al. | 164/333 |
| 3,723,699 | 3/1973 | Allen | 219/78 |
| 3,729,799 | 5/1973 | Eberle | 29/731 X |
| 3,793,086 | 2/1974 | Badger | 136/134 |
| 3,840,169 | 10/1974 | Steranko et al. | 228/104 |
| 3,869,316 | 3/1975 | Matter | 136/134 |
| 3,897,269 | 7/1975 | Sabatino et al. | 136/176 |
| 3,914,134 | 10/1975 | Carson | 429/160 |
| 3,947,290 | 3/1976 | Matter et al. | 136/134 |
| 3,988,169 | 10/1976 | McLean | 29/623.1 |
| 4,013,864 | 3/1977 | Tiegel et al. | 219/80 |
| 4,029,855 | 6/1977 | Dougherty et al. | 429/82 |
| 4,046,062 | 9/1977 | Matter | 29/623.1 |
| 4,050,501 | 9/1977 | Eberle | 228/901 X |
| 4,100,674 | 7/1978 | Tiegel | 29/623.1 |
| 4,144,927 | 3/1979 | Emerton et al. | 164/108 |
| 4,166,210 | 8/1979 | Eberle | 219/86.22 |
| 4,241,780 | 12/1980 | Eberle | 164/333 |

FOREIGN PATENT DOCUMENTS

| | | |
|---|---|---|
| 0044565 | 7/1981 | European Pat. Off. |
| 1501233 | 3/1975 | United Kingdom |
| 1427325 | 5/1976 | United Kingdom |
| 1579243 | 3/1977 | United Kingdom |
| 2073460 | 3/1981 | United Kingdom |
| 2070488 | 9/1981 | United Kingdom |

Primary Examiner—Kenneth J. Ramsey
Attorney, Agent, or Firm—Augustus J. Hipp; Dennis R. Schlemmer

[57] ABSTRACT

An apparatus for welding through-the-partition intercell connections in a lead-acid battery container wherein each partition has at least two spaced apertures therein for making such intercell connections includes in the exemplary embodiment three weld stations and a crimping station through which the containers are sequentially conveyed, and the containers are aligned and retained at dual positions in each station so that the welding or crimping operation can be carried out. A microprocessor based programmable controller serves as a master control to operate the apparatus, and a slave control is associated with each welding station.

22 Claims, 26 Drawing Figures

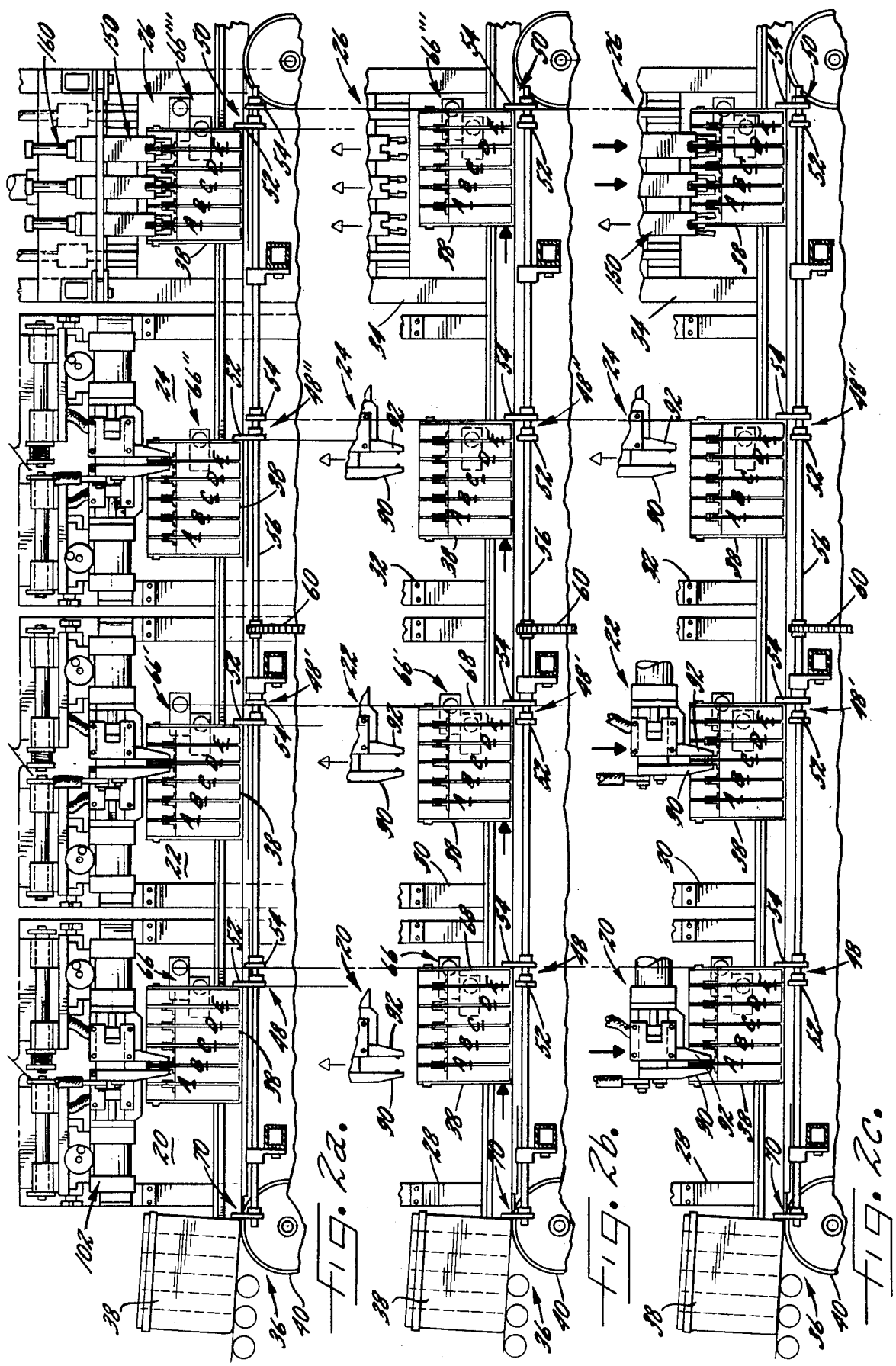

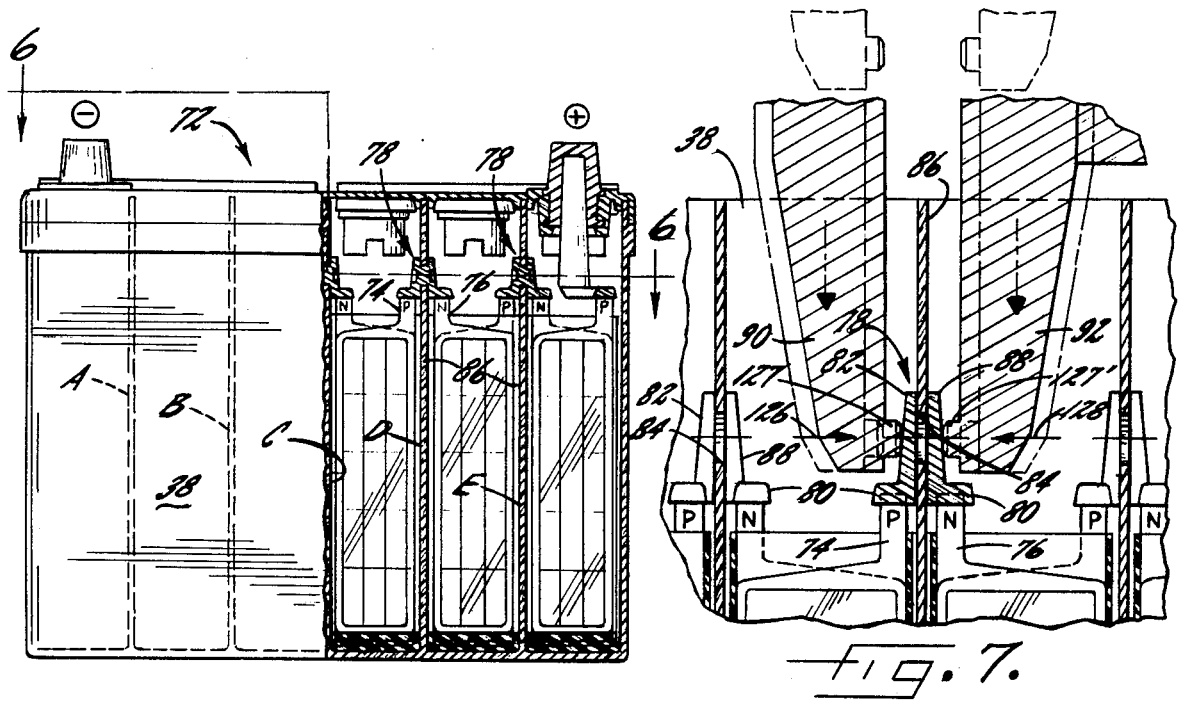
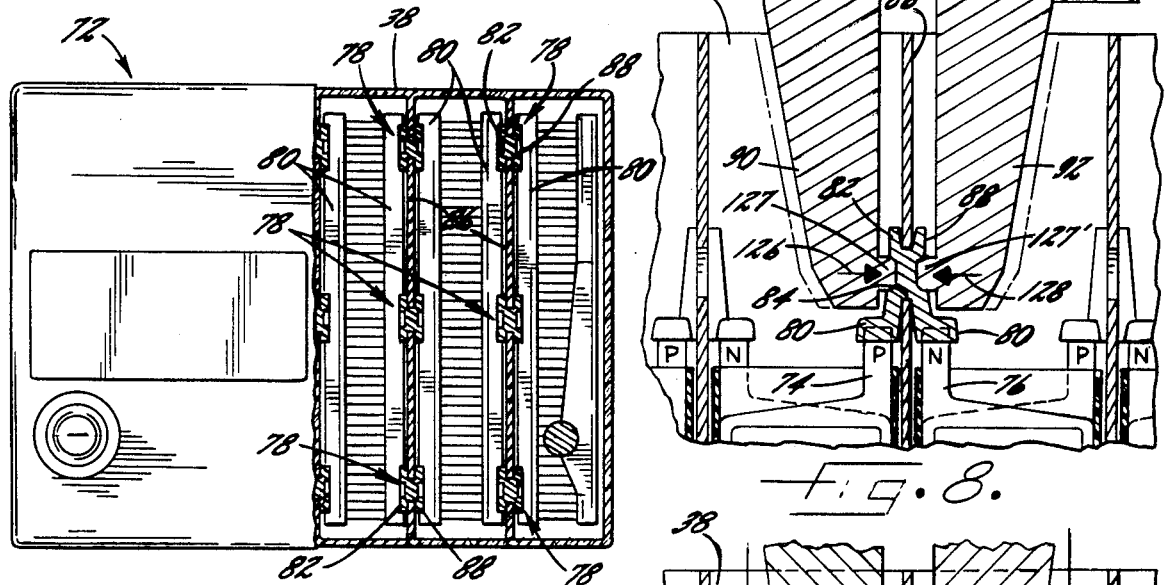
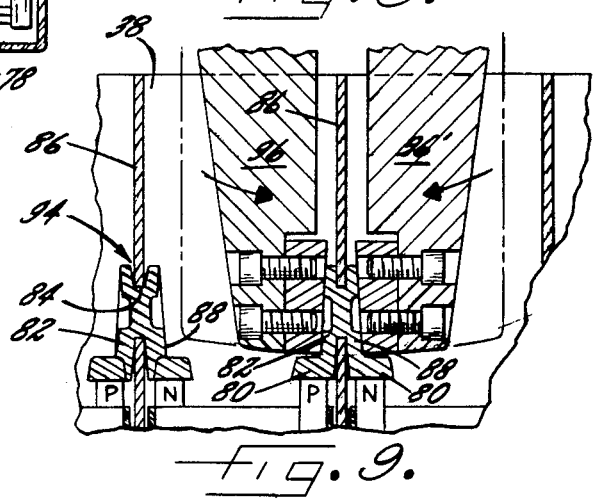

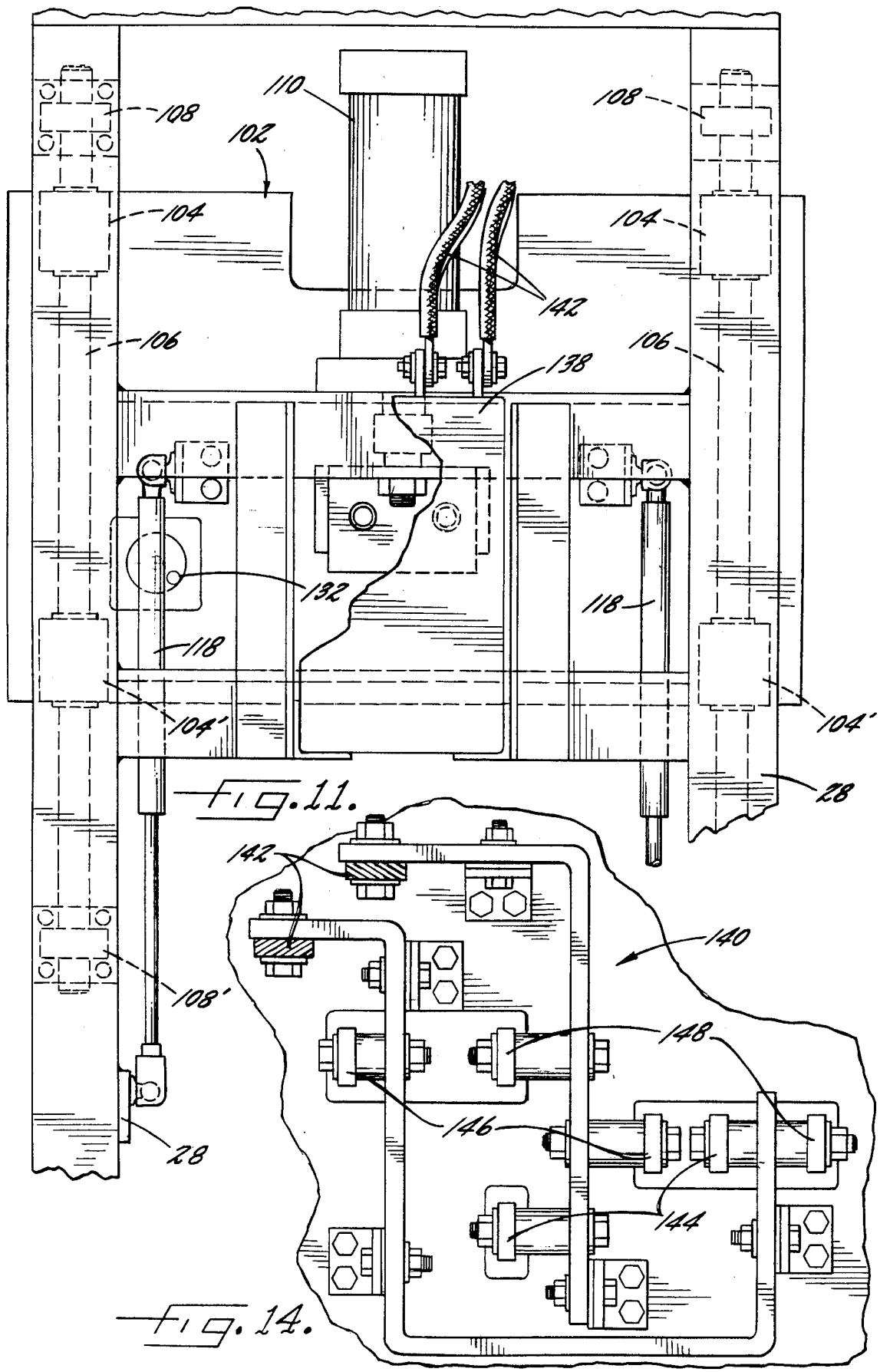

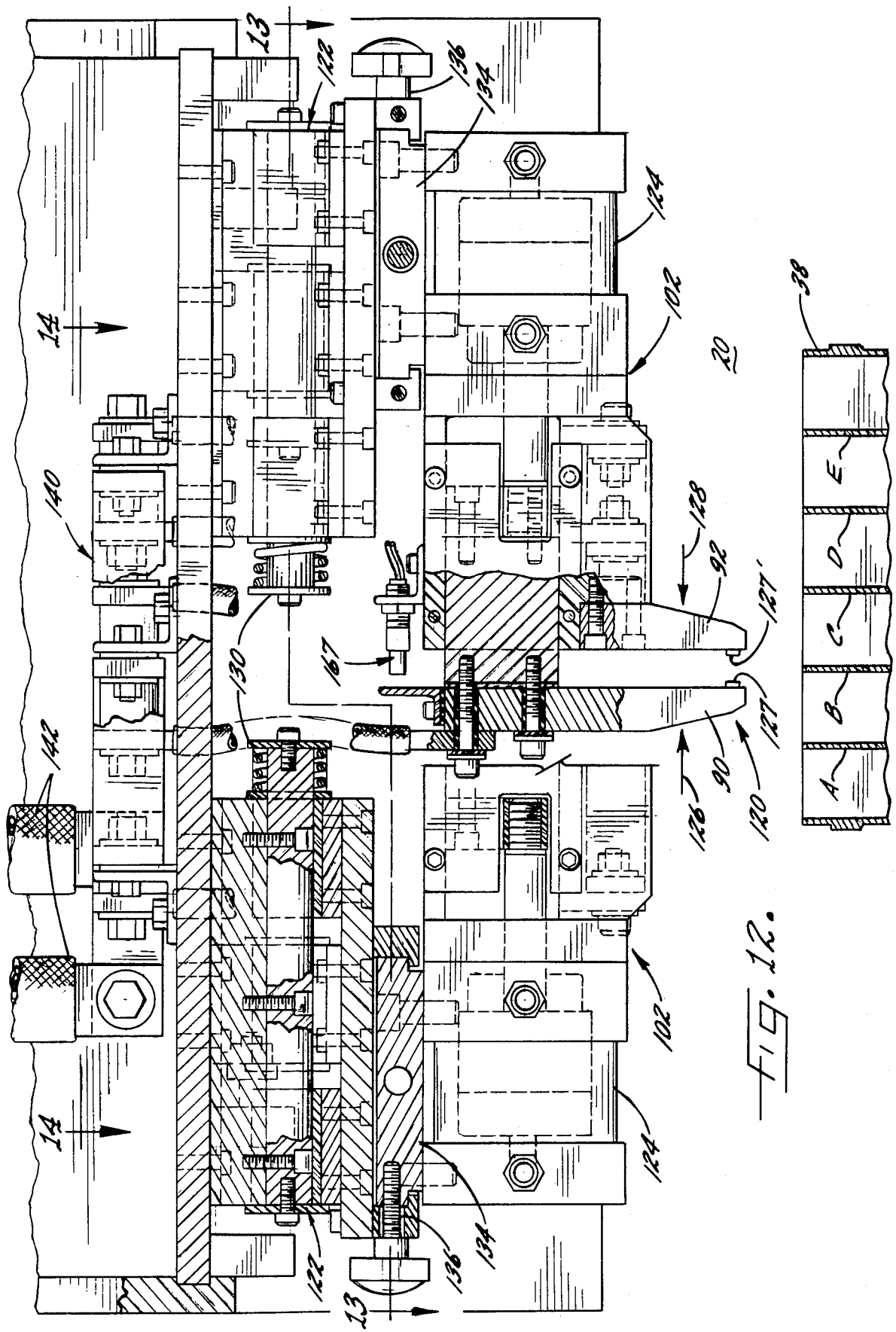

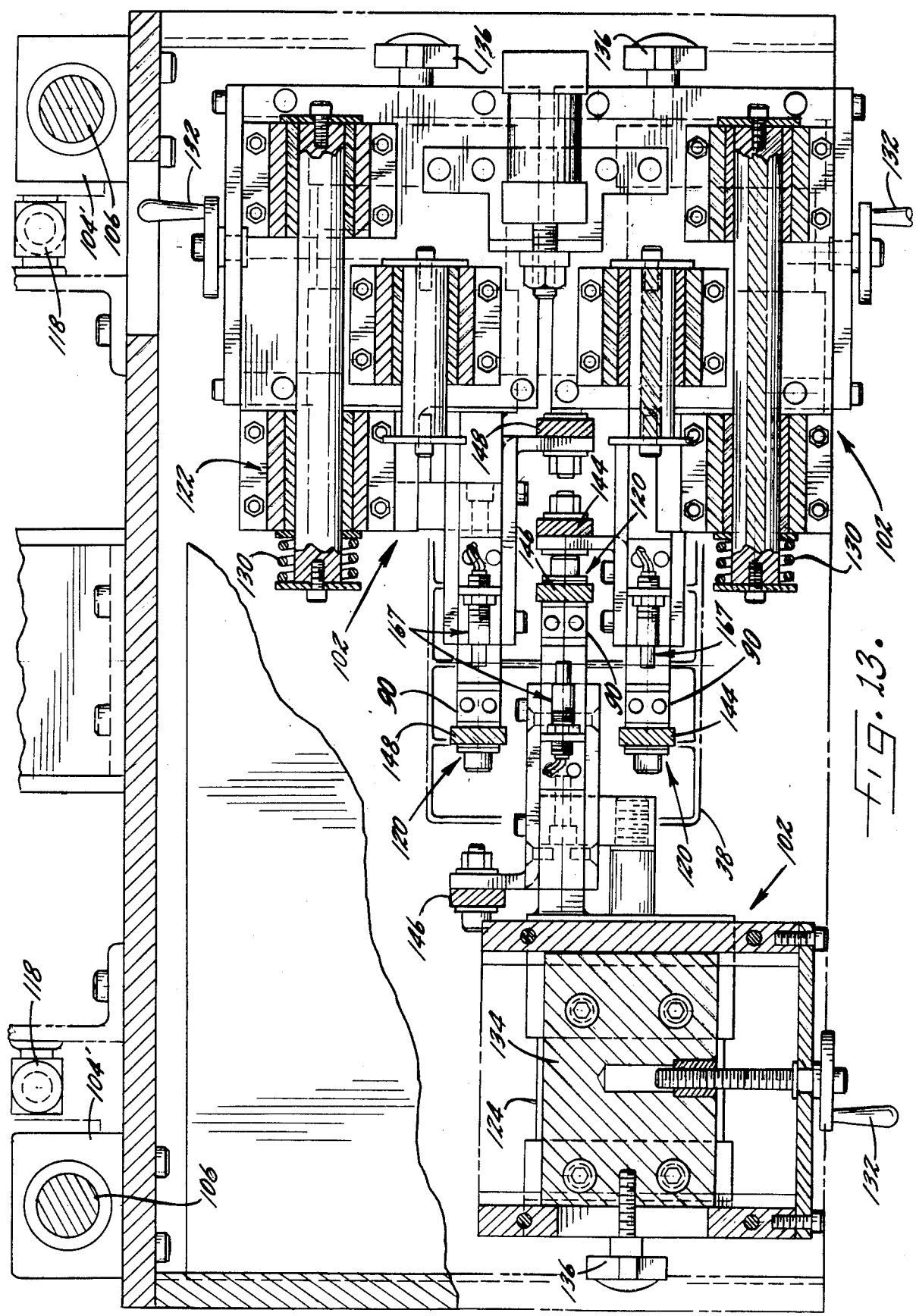

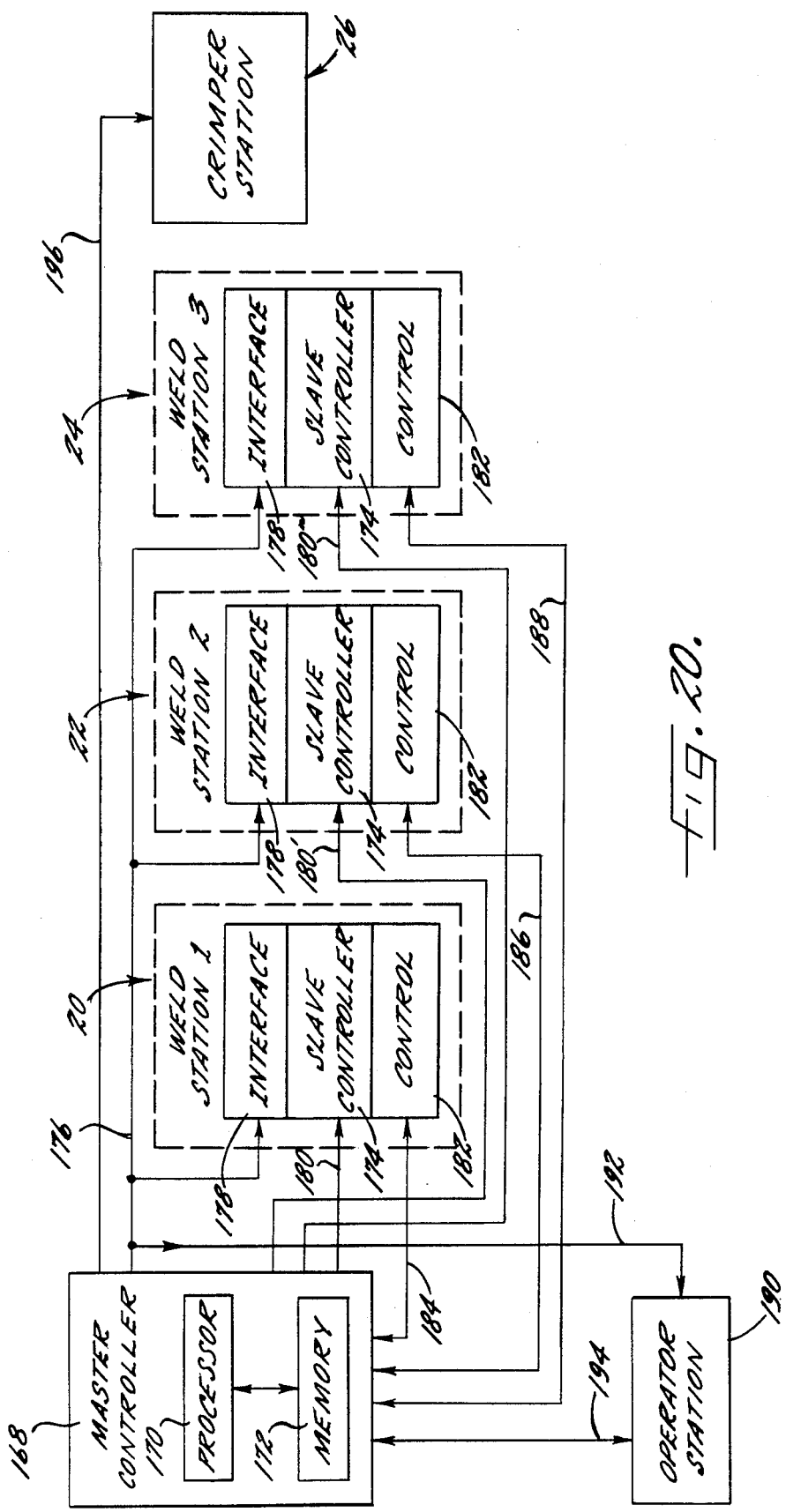

MEANS FOR WELDING INTERCELL CONNECTIONS

RELATED APPLICATIONS

Klang and Rao, U.S. Ser. No. 352,924, filed Feb. 26, 1982, for: Lead-Acid Battery and Method of Making Same; a continuation-in-part of U.S. Ser. No. 245,772, filed Mar. 20, 1981 now abandoned.

BACKGROUND OF THE INVENTION

The present invention relates to assembly apparatus for lead-acid batteries, and, more particularly, to welding apparatus for connecting battery elements in a through-the-partition fashion.

Lead-acid storage batteries are well known and generally consist of a series of cells, usually three or six, connected in series to provide the desired voltage output. Six cell, lead-acid batteries are used extensively for automobiles, often being termed "SLI" (starting, lighting and ignition) batteries.

Over the years, many configurations have been suggested for connecting adjacent cells in such batteries. At present, the construction most typically used involves making such connections in a through-the-partition fashion. U.S. Pat. No. 3,313,658 to Sabatino et al. and U.S. Pat. No. 4,013,864 to Tiegel et al. are examples of prior methods and apparatus for effecting such connections. Such apparatus is designed to make the necessary intercell connections in the conventional battery constructions, viz.—in which only a single connection is needed through each cell partition.

However, the battery industry is continually being faced with seemingly ever-increasing demands. There is accordingly considerable pressure on automobile manufacturers to provide improved performance, e.g.—better gas mileage; and this translates to efforts to reduce the overall weight of the automobile as much as possible. Lighter weight batteries are likewise being required so as to contribute to weight reductions. Similarly, there is a tendency for requiring a smaller-sized battery, simply due to the amount of space available under the automobile hood.

At the same time, the number of smaller-sized automobiles with smaller engines currently in service has risen dramatically. While the batteries used for such smaller automobiles can be smaller, the designs required need to be more efficient. Thus, for example, reducing a 350 cubic inch engine to one-half that size does not allow reducing the battery performance requirements to the same extent. The starting or cranking power, as one example, which is required for such a smaller engine, is thus more than one-half the requirement for the 350 cubic inch engine. Moreover, four cylinder engines require a substantially higher cranking speed to obtain engine starting. Indeed, some four cylinder engines require up to one and one-half to three times the cranking speeds of V8 engines.

The increase in popularity of diesel-powered automobiles has also contributed to the demand for more efficient batteries. Engines of this type thus require more starting power than a comparably sized gasoline-powered engine. As a result, it is not unusual to see a diesel-powered automobile employ two batteries in parallel or utilize an extremely large battery, almost approaching a truck battery size.

These and other considerations dictate that battery manufacturers provide a battery with substantially improved performance characteristics. The co-pending Klang et al. application identified herein describes a battery having exceptionally high power characteristics per unit weight or volume in relation to commercially available maintenance-free and other SLI batteries.

The type of battery described in the Klang et al. application readily lends itself to production on a large scale, high volume basis. However, the commercially available, intercell welding apparatuses cannot be used for welding the connections in such batteries without some modification. First of all, in embodiments of such batteries wherein the power characteristics per unit weight or volume are optimized, there will generally be considerable variation in size and mass from that of conventional battery components, such as, for example, the size and mass of the battery plates as well as the total top lead weight, viz.—the weight of the straps and terminals. As an example, the top lead in the Klang et al. batteries may be reduced to about 75% or so of that used in conventional batteries. This generally means that the mass of the strap is much smaller than is conventionally used, as are the strap projections (often termed "lugs" or "tombstones") which are fused to provide the through-the-partition intercell connections. Modifications in conventional welding apparatus to satisfactorily weld such smaller lugs or projections are thus required.

Moreover, and importantly, the Klang et al. batteries include multiple intercell connections, as opposed to the single intercell connection commonly used in conventional battery designs. In the Klang et al. batteries, at least two intercell connections are employed, often three or even perhaps four or more such connections being desirable. When three such connections are employed for example, this increases the number of welds from the five needed in a conventionally designed battery to fifteen such connections. Also, after the initial intercell connection is made through a particular cell partition, alternate current paths will be developed in the welding procedure which can adversely affect the desired characteristics of the weld.

It is also desirable in automating such production to provide speeds which are generally commensurate with the speed at which other assembly operations can be carried out. For example, plastic battery assembly lines for sealing the cover of a battery to the container can process one battery every 20 seconds or so. So as to provide satisfactory production rates, it is useful to provide a welding apparatus capable of achieving such production rates as well.

SUMMARY OF THE INVENTION

A principal object of the present invention is to provide an intercell welding apparatus for lead-acid batteries which allows satisfactory welds to be obtained on a commercial scale. A related and more specific object provides such an apparatus capable of operating at speeds commensurate with those of conventionally used plastic battery assembly lines.

A further object of this invention provides an intercell welding apparatus for lead-acid batteries capable of compensating, when required, for differing requirements from one weld to another within the battery.

Another object of this invention provides such an apparatus having control means allowing for the welding conditions to be readily changed as dictated by varying conditions.

A still further object of the present invention is to provide such an intercell welding apparatus which minimizes the likelihood of a battery being processed through the apparatus in such a fashion as to have less than all of the desired intercell connections being made.

Other objects and advantages will be apparent from the accompanying drawings, in which:

DESCRIPTION OF THE DRAWINGS

FIGS. 2a through 2c are partial side elevation views of the apparatus and show the welding and crimping operations which take place at the two positions of each station;

FIG. 5 is a side elevation view of an assembled battery, the container being partially cut away to show the completed through-the-partition intercell connections;

FIG. 6 is a cross-sectional view taken generally along the line 6—6 of FIG. 5 and further illustrates the multiple intercell connections made;

FIG. 7 is a side elevation view of a portion of one pair of the welding electrodes and showing the electrodes in position prior to initiation of the welding operation;

FIG. 8 is a side elevation view similar to FIG. 7 and showing the electrodes in their final position at the completion of the welding operation;

FIG. 9 is a view similar to FIGS. 7 and 8, except showing a portion of the crimper heads;

FIG. 11 is a cross-sectional view taken generally along the line 11—11 of FIG. 10 and further illustrates the carriage for the welding electrodes;

FIG. 12 is a cross-sectional view taken generally along the line 12—12 of FIG. 10 and showing the means for moving a pair of welding electrodes relative to one another;

FIG. 13 is a cross-sectional view taken generally along the line 13—13 of FIG. 12 and illustrating the means for adjusting the location of the welding electrodes;

FIG. 14 is a cross-sectional view taken generally along the line 14—14 of FIG. 12 and showing the electrical connections for the welding electrodes;

FIG. 20 is a simplified block diagram illustrating the coordination of the welding and crimping apparatus with the control means therefor.

Figure 1:
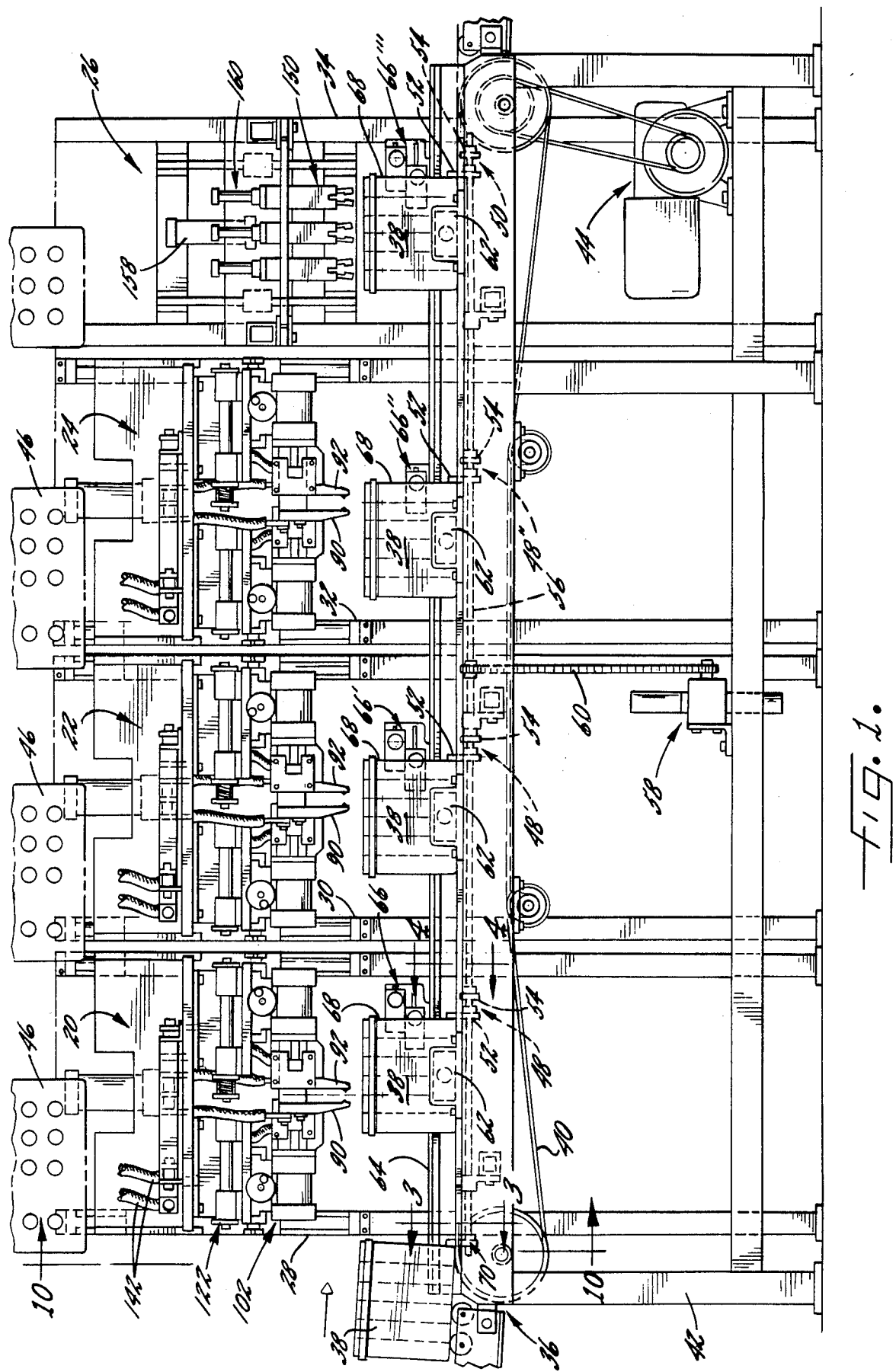
FIG. 1 is a side elevation of an exemplary embodiment of the intercell welding apparatus of this invention and illustrating the respective welding and crimping stations.

While the invention will be described in connection with preferred embodiments, it will be understood that we do not intend to limit the invention to these preferred embodiments. On the contrary, we intend to cover all alternatives, modifications, and equivalents as may be included within the spirit and scope of the present invention as defined in the appended claims. Thus, while the present invention will be described in conjunction with a SLI automotive battery, it should be appreciated that the invention is equally applicable to any other lead-acid battery application. Moreover, while the illustrative embodiment utilizes multiple stations, multiple electrode pairs at each station, dual position functioning at each station and a particular welding sequence, it should be appreciated that many variations in these parameters can be made witout departing from the spirit of the present invention. Still further, while the illustrative embodiment of the present invention shows the workpiece being welded as a battery container, any other workpiece may likewise be welded with appropriate modification to accommodate the particular welding requirements involved.

In general, the intercell welding apparatus of the present invention provides in one aspect a control means capable of compensating for conditions which require the welding conditions of one weld to differ from those of another. In this same respect, the intercell welding apparatus of the present invention is particularly amenable to incorporation of weld testing means such that satisfactory compensation can be readily made to adapt to changing conditions. The present invention likewise provides apparatus particularly adapted to efficiently weld intercell connection where multiple connections through-the-partition are needed. The subject apparatus allows the necessary welding operations to be carried out in a reliable fashion and at a sufficient production rate to be compatible with the existing processing rates of other conventional battery assembly techniques. Other features of the present invention will be described in conjunction with the illustrative embodiment in the following detailed description.

DETAILED DESCRIPTION

Turning now to the drawings, there is shown an exemplary embodiment of the intercell welding apparatus of the present invention. In this illustrative embodiment, there are three welding stations, which will be identified as welding station No. 1, shown generally at 20, welding station No. 2, shown generally at 22, welding station No. 3, shown generally at 24 and a crimping station, shown generally at 26. Each of these four stations have a frame means for mounting the necessary welding or crimping apparatus. Thus, upstanding frames 28, 30 and 32, respectively, carry the necessary welding apparatus for weld stations 1, 2 and 3. Upstanding frame 34 carries the necessary crimping means for crimper station 26.

Conveying means shown generally at 36 are utilized to transport the battery containers into and through the various stations. As shown, the containers 38 are transported through the apparatus by conveyor 40, mounted on frame 42, and driven by conventional motor 44 through appropriate gearing. Operation of the conveyor motor 44 is controlled by the master controller (FIG. 20), being connected thereto by conventional machine connections.

Each welding station includes a slave control means which operates in response to the master control means to carry out the welding operation. Such slave control means are shown generally at 46.

The master control means likewise regulates operation of the crimper station 26. Such control means may be connected to the crimper station through standard machine connections.

In accordance with one aspect of the present invention, the battery containers are positioned at the appropriate location in each station by aligning and retaining means. Such means both accurately align the container so that the welding or crimping function can be satisfactorily carried out as well as positively clamping or retaining the container in such proper position while the welding or crimping is being carried out. Travel through the apparatus in what may be termed the machine direction ceases when the container reaches stop means, shown generally at 48, 48' and 48" in welding stations 1 through 3 respectively and at 50 in crimper station 26. As will be described hereinafter, the stop means each comprise cams 52 and 54 mounted on shaft 56. The shaft 56 is rotated by a conventional pneumatically controlled rotary air actuator system shown generally at 58 via chain 60 in response to the master control means as will be more fully discussed hereinafter.

The aligning and retaining means also provide positioning of the containers relative to the welding heads in the direction transverse to the machine direction. To this end, transverse positioning means shown generally at 62 are located at each station to position containers 38 against guide rail 64. Positioning means 62 are actuated by the master control means and maintain positive contact with the container until the welding or crimping operation is complete. Each container is thus effectively held in position on three sides, as can be seen more clearly in FIG. 10, thus obviating any undesired movement during the welding or crimping operation.

To prevent damage to the container, the welding heads or the apparatus itself, sensing means are provided at each station for determining the presence of a battery container in its proper location. As shown in FIG. 1, photoeyes 66, 66', 66", 66"' are positioned at welding stations 1 through 3 and crimper station 26, respectively, to sense the leading edge 68 of the container 38 as well as the proximity to the photoeye. The photoeyes 66 through 66"' signal the master control means, identifying whether the particular container is in its proper location or not relative to both the stop means and the guide rail. Sensing means utilizing electromagnetic radiation are known and may be employed. Particularly useful are conventional convergent beam photoelectric scanners.

Entry means are also provided to regulate entry of containers into the first welding station 20. To this end, cam stop means 70 is mounted on shaft 56 and is operated in concert with stop means 48-48" and 50 for the respective welding and crimping stations. The particular sequencing will be further described in conjunction with FIGS. 2a through 2c.

While any appropriate aligning and retaining means may be utilized, the illustrative embodiment provides a compact, efficient and effective system for insuring that the battery containers reach the proper location in each station and are retained in such location during the welding or crimping operation which will take place. In this connection, the cam stop means shown can be quickly moved from position-to-position as the machine sequence is carried out.

FIGS. 2a through 2c show the welding and crimping sequence which takes place at each station. For ease of description, the cell partitions of each container 38 have been designated A through E, starting with the trailing end of the container. As illustrated in FIG. 2a, the through-the-partition welds in cell partitions B, D and E are made in the initial position at welding stations 20, 22 and 24, respectively while at crimper station 26 the intercell welds in cell partitions A, C and E are crimped.

After the welding and crimping heads are retracted, the containers are then indexed in the machine direction (shown by the arrow) about the width of one cell to the second and final position at each station, as is schematically shown in FIG. 2b. In this position, proper machine direction alignment of the containers 38 is obtained by the respective second cam stops 54 at the various stations, the initial cam stops 52 having been rotated from their operative position shown in FIG. 2a to a position allowing the battery containers to be conveyed to the second position shown in FIG. 2b.

FIG. 2c illustrates the welding and crimping operations carried out in this second position. As shown, the intercell welds in partitions A and C are effected at welding stations 20 and 22, respectively. The welding heads at welding station 24 remain in their retracted position since the intercell welds in partition D were previously made at welding station 22 in the initial position, as seen in FIG. 2a. The necessary crimping function for the intercell welds in cell partitions B and D are likewise effected as illustrated.

The next step in the sequence involves the movement of the battery containers to the next downstream station. At this same time, the battery container exiting crimper station 26 has had the necessary intercell connections made and may be further processed in subsequent assembly steps, such as the application of the cover to the container. Rotation of the entry stop means allows a new container to enter the initial welding station 20.

Considering the sequencing of a single container as it proceeds through the apparatus, the intercell welds in partition B are made in the first position of weld station 20 (FIG. 2a). The container is then indexed to the second position (FIG. 2c) where the intercell connections through partition A are made. The container is then conveyed to the weld station 22 where at the first position (FIG. 2a) the welds in partition D are made and, at the second position (FIG. 2c), the intercell connections through partition C are effected. After being conveyed to weld station 24, the intercell connections through partition E are effected at the first position (FIG. 2a). No welding operation occurs at the second position of weld station 24 (FIG. 2c), as the intercell connections in partition D were effected previously. The container is then conveyed to crimper station 26 where the welds through partitions A, C and E are crimped at the first position (FIG. 2a). After indexing to the second position (FIG. 2c), the welds through partitions B and D are crimped. The thus-welded battery may then be subjected to further processing as required.

Figure 3A:
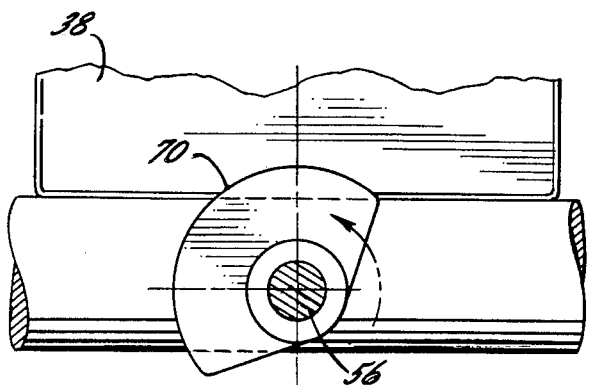
FIGS. 3a through 3c are cross-sectional views taken generally along the line 3—3 of FIG. 1, showing various positions of the stop means which regulates entry of a battery container into the first welding station.
Figure 4A:
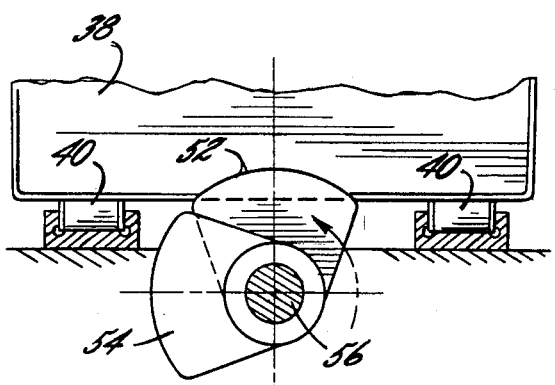
FIGS. 4a through 4c are cross-sectional views taken generally along the line 4—4 of FIG. 1 and illustrate various positions of the stop means which aid in properly locating the battery containers in the two positions of the respective welding and crimping stations.
Figure 3B:
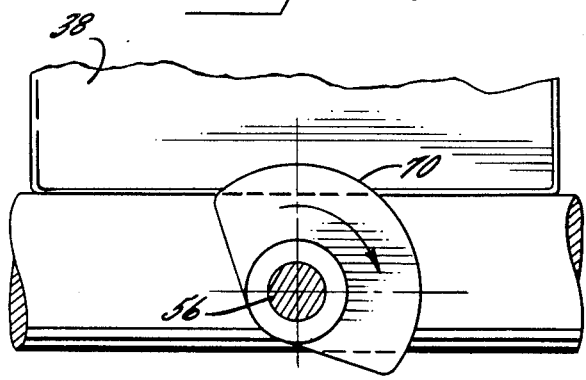
Figure 4B:
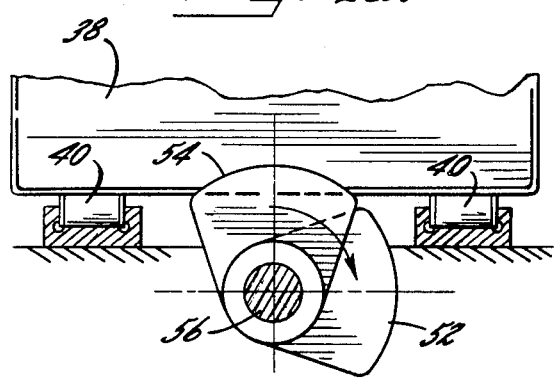
Figure 3C:
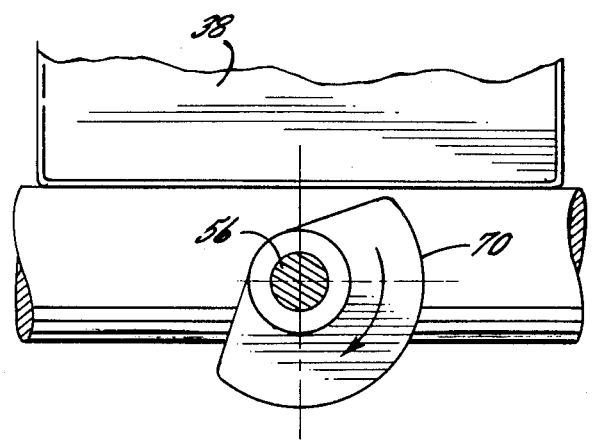
Figure 4C:
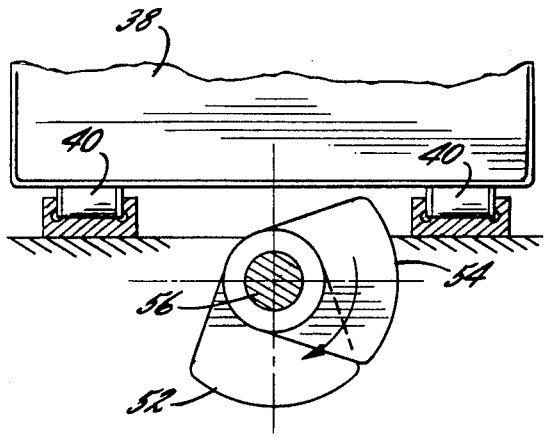

FIGS. 3a through 3c show the sequencing of the entry stop means 70 which regulates entry of containers into the initial welding station 20 while FIGS. 4a through 4c show the stop means operative at the respective welding and crimping stations. Only one set of stop means is shown in FIGS. 4a-4c for simplicity since this aspect of the operation is the same at each station.

FIG. 3a shows entry stop means 70 in position restricting entry of container in the initial welding station 20; and FIG. 3b shows the entry stop means 70 having been further rotated, as will occur when the battery containers are indexed to the second position at each station, yet still preventing entry of a container into the welding station 20. FIG. 3c shows the entry stop means 70 rotated into an inoperative position to allow the next container to enter welding station 20.

As noted previously, FIGS. 4a through 4c show the sequencing of the stop means at each of the three welding stations and the crimper station. FIG. 4a thus illustrates the cam stop 52 retaining the container in the initial position while cam stop 54 is in an inoperative position, and FIG. 4b shows cam stop 54 have been rotated into operative position while cam stop 52 has been rotated to an inoperative position so as to allow the container to move from the first to the second position in each station. FIG. 4c shows cam stops 52 and 54 both rotated to an inoperative position to allow the container to be conveyed to the next station. The next sequence returns entry stop means 70 to the position shown in FIG. 3a and the stop means 52 and 54 to return to the positions shown in FIG. 4a.

As may be appreciated, other sequences could be employed to effect the necessary intercell connections in the five cell partitions. Indeed, if desired, five separate welding and/or crimping stations could be utilized so that only a single position at each station is needed. Moreover, sequencing does not require that the indexing be the same at all stations. Thus, for example, the indexing in the initial welding station could be one cell width while the indexing in another station could be two cell widths or more.

However, the present sequence, utilizing three welding stations and a single crimping station provides an effective configuration which minimizes the capital investment that would be required with more stations while providing higher production rates than could effectively be achieved with fewer stations. Moreover, the fact that the indexing in each station is identical simplifies somewhat the conveying and aligning as the battery containers move through the apparatus.

FIGS. 5 and 6 show an illustrative embodiment of a completed battery having had the intercell connections made and the cover assembled. The battery shown generally at 72 has the configuration of the battery described and illustrated in the Klang et al. application. Positive plates 74 have thus been electrically connected to negative plates 76 in the adjoining cell through multiple, through-the-partition connections, as shown generally at 78. Straps 80 electrically connect in parallel plates of the like polarity in a given cell. While three intercell connections are shown, the number may be varied as desired, anywhere from 2 through 4 or more being generally desired, depending upon the particular performance characteristics required for the particular application.

FIGS. 7 through 9 illustrate the welding and crimping functions which take place in the apparatus of the present invention. As shown, the strap 80 for the positive plates 74 has a plurality of spaced upstanding lugs or tombstones 82 positioned adjacent a plurality of like-spaced apertures 84 in cell partition 86. Similarly, negative plates 76 are electrically connected in parallel by strap 80, which has a plurality of spaced upstanding lugs 88 positioned adjacent the corresponding apertures in the face of cell partition 86 opposite to that to which positive lugs 82 abut. In adjoining cells the two lugs (one in each cell) positioned adjacent each aperture form a "set" of lugs which is to be fused and it is intended that at least two such sets of lugs will be welded or fused through each partition wall. In FIG. 7, an illustrative welding head having welding means in the form of a pair of electrode heads 90 and 92 have been moved into position adjacent lugs 82 and 88, respectively, to initiate the welding or fusion operation. FIG. 8 shows electrodes 90 and 92 at the relative position assumed when the welding or fusion operation has been completed. As can be seen, portions of the lugs 82 and 88 have been displaced from their initial position into aperture 84, effectively filling the aperture.

There is some tendency for the lugs following the welding operation to slightly recede from contact with the partition, as can be generally seen at 94 in FIG. 9. Accordingly, while not an essential operation, it is considered generally desirable to mechanically crimp the welded, intercell connections to again position the lugs solidly against the partition wall. This is accomplished, as shown in FIG. 9, by inward movement of crimper heads 96 and 96', as will be more fully described hereinafter.

Figure 10:
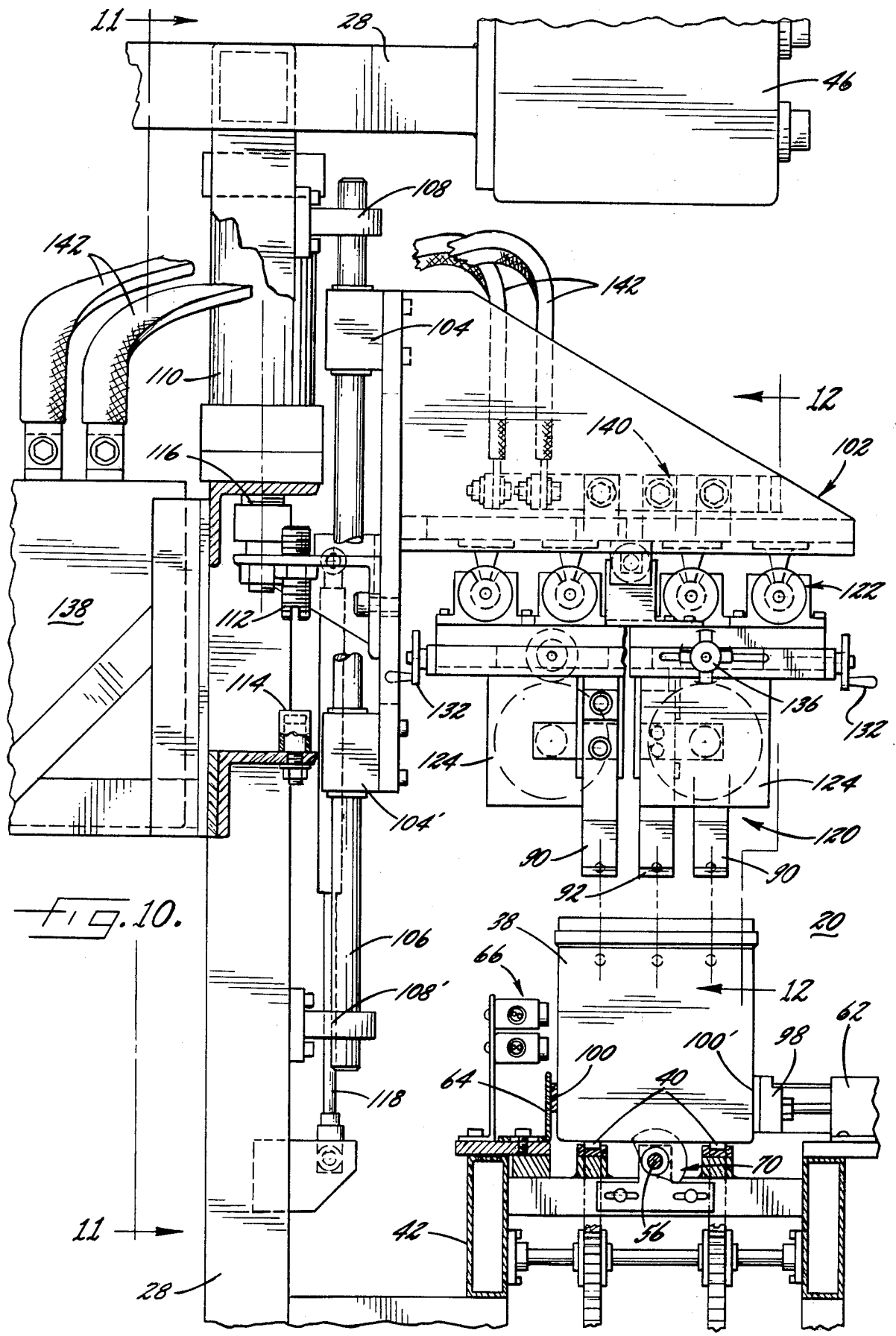
FIG. 10 is an end elevation view from the entry end of the illustrative apparatus and showing the means for sensing whether the battery container is in the desired location, the means for aligning the battery container and the apparatus at this welding station.

Before turning to the description of the illustrative means for carrying out the intercell welding, FIG. 10 further illustrates the functioning of the aligning and retaining means maintaining a battery container in position for the welding operation. Once the battery container has reached cam stop means 48, the master control means, connected by conventional machine connections to positioning means 62, actuates positioning means 62, causing a pusher arm 98 to extend, retaining the container 38 between the pusher arm 98 and against the guide rail 64. Both the pusher arm and the guide rail may be suitably padded, as shown at 100, 100', to minimize any marring or the like of the container.

As has been previously referred to, one embodiment of the battery set forth in the Klang et al. application may utilize considerably less top lead than generally used in conventional SLI batteries. A consequence is that the size of the cell apertures and that of the lugs may be much smaller than those employed in conventional SLI batteries. For example, a suitable cell aperture for a Klang et al. battery may be only about 9/32 inch in diameter or so with the lug having a thickness adjacent the strap of about 0.140 inch tapering to a thickness of about 0.10 inch at the top of the lug. With the cell apertures being smaller, the height and width of the lugs are correspondingly smaller in dimension, providing just enough material to fill each aperture after welding as well as to sufficiently overlie the aperture as is shown in the drawings. It has been found that the welding conditions necessary to provide satisfactory intercell welds with such smaller lugs are more sensitive than the conditions needed when making intercell welds in conventional SLI batteries.

Accordingly, pursuant to one aspect of the present invention, when such smaller lugs and apertures are being utilized in the batteries being processed, welding conditions are employed which allow consistently satisfactory welds to be obtained under such relatively sensitive conditions. To this end, the welding electrodes are designed so that the electrode tips which displace portions of the lugs into the cell partition apertures are allowed unrestricted movement during the welding operation. Stated another way, the electrode tips are of sufficient length such that the body of the electrode does not come into contact with the lug during the welding operation. In this fashion, the electrode tips are allowed to continue to displace metal from the lug into the aperture during the entire welding operation. It is believed that this continued displacement of lug metal provides the most ideal condition for use in the welding process since unrestricted follow-up of the weld jaws is necessary in order to achieve high quality welds and no lead explusions.

In addition, with such smaller lugs and apertures, the welding operation should be preferably carried out such that the protusion of each of the electrode tips into the cell partition apertures is at least generally equal. Any substantial imbalance could result in unsatisfactory welds due to voids, blow-outs or the like. Stated another way, the relative pressures on each side of the weld should be such as to hold the molten metal in the desired location.

The welding apparatus shown in FIGS. 10 through 13 provide one means for achieving welds with satisfactory characteristics when welding conditions are relatively sensitive, as when the lugs and cell partition apertures are smaller than in conventional designs. Any other type of welding apparatus may be employed which will meet the criteria described herein.

Moreover, when the welding conditions are no more sensitive than those encountered in welding intercell connections in conventional SLI batteries, the welding apparatus utilized can be any type capable of making welds satisfactory for the intended battery application. Many such welding techniques and apparatus are known and it is contemplated that the welding apparatus incorporate a welding head comprising electrically actuated welding means adapted to engage and sequentially fuse or weld the lugs of both cells through-the-partition by any means for electrically actuating the fusion or welding operation in a sequential manner for forming the multiple intercell connections adjacent each aperture.

Turning now to the welding apparatus shown in FIGS. 10 through 13, the welding assembly at each station is mounted for movement relative to the battery container to bring the electrodes into position for the welding operation. As best seen in FIGS. 10 and 11, a welding subassembly shown generally at 102 for welding station 20 is mounted via bearing blocks 104, 104' to rod 106, which is in turn mounted on upstanding frame 28 by brackets 108, 108'. Cylinder 110 moves the welding subassembly into position in the battery container. The operative position for welding is determined by adjustable stop means 112 which seats on stub 114, which is, in turn, mounted on a shaft (shown in phantom). Stub 114 may accordingly be removed and replaced by one of a different size, as may be required when the size of the battery container being processed varies more than can be desirably accommodated by the fine tuning of adjustable stop means 112. Stop means 116 can be used to adjustably determine the upward, retracted position. If desired, means such as conventional gas springs 118 may be utilized to aid in the movement of the welding subassembly to its retracted position.

As best shown in FIG. 10, the three sets of electrodes shown generally at 120 are mounted for slidable movement as generally shown at 122 so that the electrode pairs move to the desired position relative to one another for the welding operation. Referring to FIG. 12, electrode 90 is connected to cylinder 124 by any suitable means as shown. Actuation of the cylinder 124 moves electrode 90 inwardly in the direction of the arrow 126, causing electrode tip 127 to displace a portion of the lug into the cell partition aperture, a best seen in FIG. 8. Electrode 92 is generally fixed in position but is allowed movement as the resistance of the lugs 82 (FIGS. 7 and 8) cause the electrode pair to self-center, moving electrode 92 inwardly in the direction of arrow 128. Movement of electrode 90 as well is effected. Spring 130 (FIG. 12) associated with each electrode pair aids in returning the electrode pair to the proper location after completion of the welding operation. The action described likewise allows electrode tip 127' of electrode 90 to penetrate into the lug, displacing lug metal into the cell partition aperture (FIG. 8). It has been found that the relative penetration of electrode tips 127, 127' into the cell partition aperture in the illustrative apparatus is generally the same during the welding operation.

Moreover, as has been described herein, the electrode tips 127, 127' should be designed with sufficient length, when welding conditions may be more sensitive, such that movement into the cell partition aperture is not restricted by contact of the body of electrodes 90, 92 with the lugs 82, 88 (FIG. 8). While contact of the electrode tips can be avoided by controlling the time of the welding cycle, it may be desirable as a safety precaution to include means preventing physical contact of the electrode tips. This can be achieved, for example, by having the cylinder to which electrode 90 is attached bottom out prior to contact. Alternatively, conventional limit switches or the like may also be employed.

Adjustment means may be provided to allow relative movement of individual pairs of electrodes parallel to the cell partition so as to insure that the electrodes are in the proper location relative to lugs 82 and 88 for welding. In this fashion, each set of electrodes may be positioned in the precise location desired, should any fine tuning be required. Thus, as best shown in FIGS. 10 and 13, a handle 132 may be manually rotated to reposition block 134 which slides the electrodes relative to the aperture in the cell partition. Set screw 136 clamps block 134 in the desired position after adjustment.

The welding apparatus at welding stations 22 and 24 may be identical to that shown in FIGS. 10 through 13, and this is preferred. Of course, if desired, different apparatus could be used from one station to another.

In accordance with the preferred embodiment of the present invention, an electrode pair is provided for each intercell connection to be made in a single cell partition. This obviates the necessity for providing means to move the electrodes from one weld location to another. The necessary electrodes are simultaneously moved into position, allowing the intercell connections in a single partition to be rapidly effected.

A further aspect of the present invention also results from the fact that multiple intercell connections are made through each cell partition. More particularly, it will generally be more desirable to sequentially weld the necessary intercell connections through a common cell partition since simultaneous welding may well result in somewhat uncertain welding conditions. However, even with completing one weld before the adjacent weld is started, the second welding operation should still result in a current path alternative to that desired. For this reason, and while the electrodes fairly efficiently direct the current in the desired path to effect the necessary weld, some dissipation will likely result. This could result in a weld of less than satisfactory properties being achieved. Moreover, such dissipation may have the effect of tightening processing parameters which increases the likelihood that, for example, either the initial weld will be over-welded or subsequent welds will be under-welded. In accordance with the preferred aspects of this invention, means are provided which allow the welding conditions of each intercell connection being made to be individually controlled so as to compensate for any dissipation which may occur.

Satisfactory compensation can be provided either by designing the apparatus to provide such compensation or by the inclusion of suitable controls, or both. In the illustrative embodiment, as is best seen in FIGS. 10, 11 and 14, a transformer 138 is electrically connected to a bus bar shown generally at 140 by cables 142. By appropriate selection of the location on the bus bar for each set of electrodes, compensation can be designed into the system. Thus, the initial weld which will be carried out can be located with the longest current path from the transformer. The connections for the subsequent welds can then be positioned such that shorter current paths are provided which will inherently provide greater current for welding which may offset to some extent the dissipation effects caused by the initial weld. As shown in FIG. 14, the connections to bus bar 140 for the initial weld are located at connections 144, the connections for the middle electrode pair being shown at 146 and the connections for the last set of electrodes, positioned closest to the transformer, being shown at 148.

In accordance with the preferred embodiment of the present invention, control means are provided which allow the compensation to be effected by individually varying the welding conditions for each intercell connection. This allows the welding parameters to be not only preset to take into account any compensation needed but also provides a means by which further adjustment, if needed, can be made during continued operation. Indeed, utilization of the control means provides an apparatus that is readily amenable to incorporation of weld testing means. The control means will be described in detail later.

Figure 15:
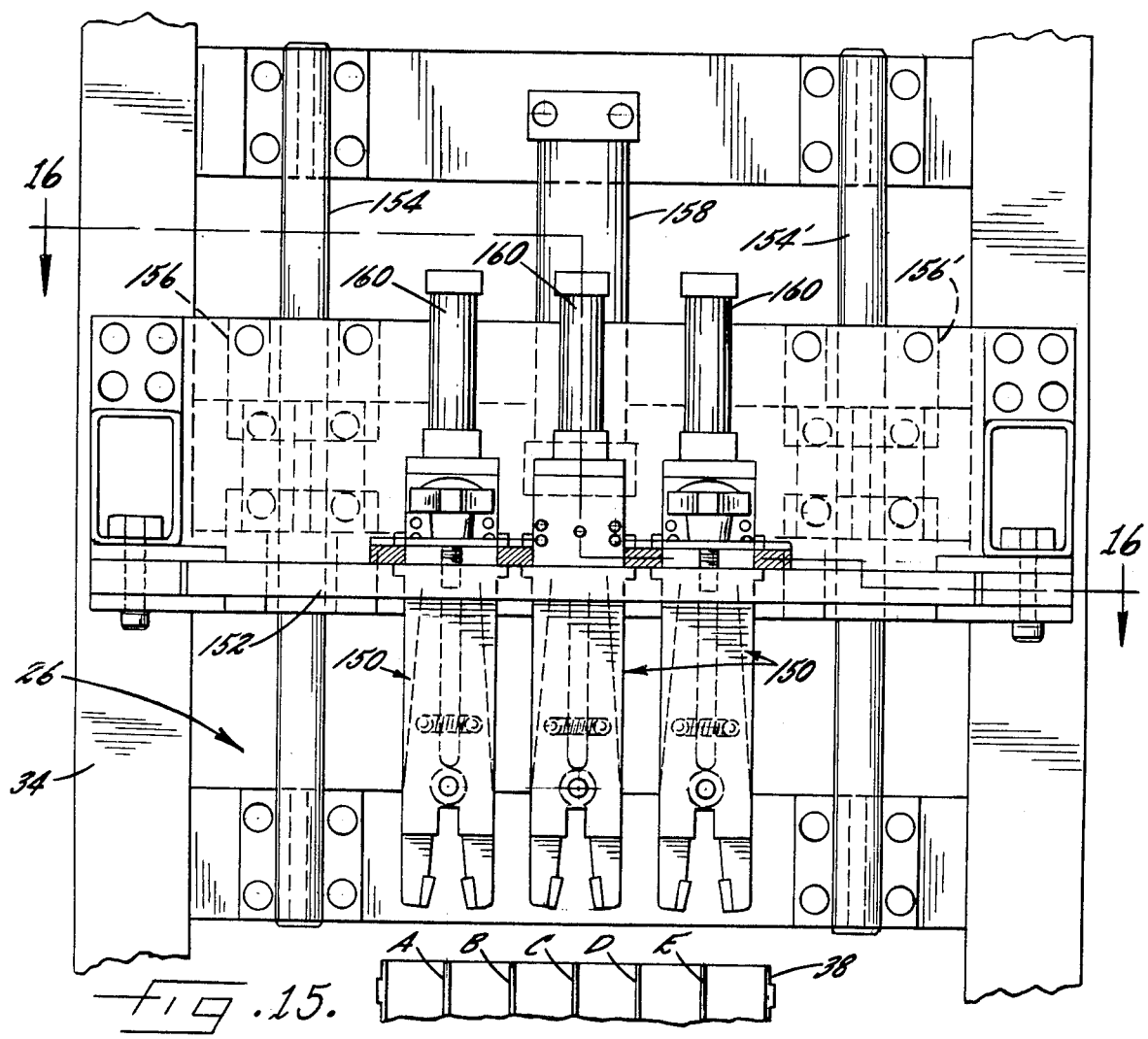
FIG. 15 is a side elevation view of the crimper station and illustrating the crimper heads in a retracted position.
Figure 16:
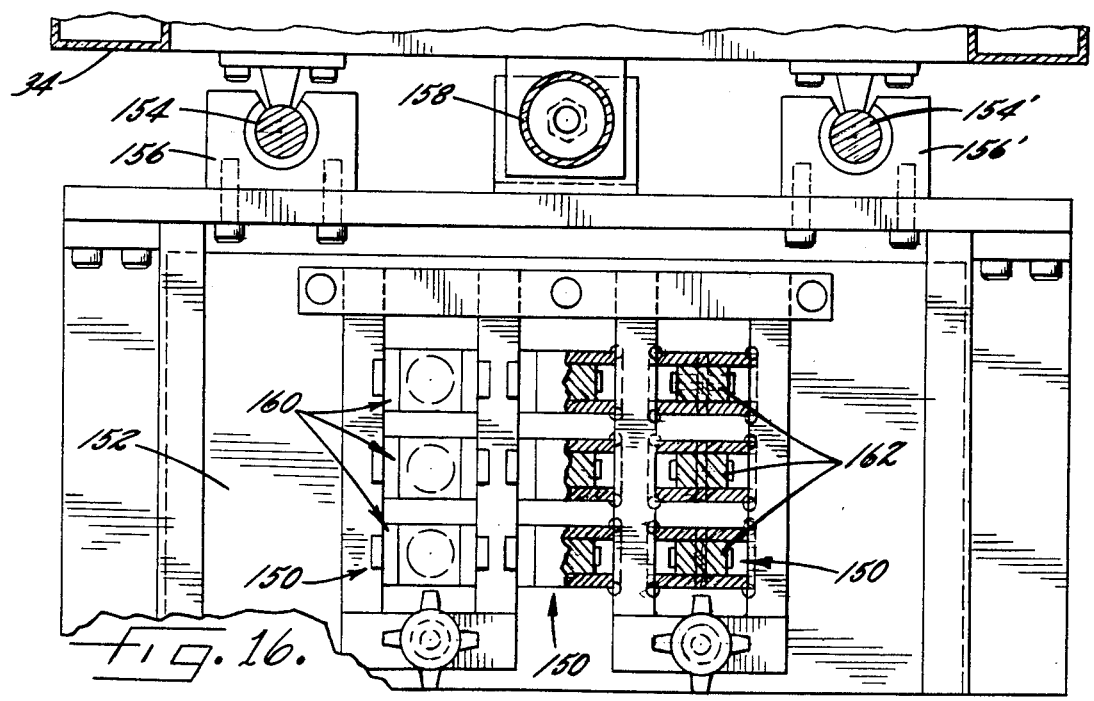
FIG. 16 is a cross-sectional view taken generally along the line 16—16 of FIG. 15 and showing the plate holding the crimper heads.

FIGS. 15 through 18 illustrate the optional crimping station 26. As seen in FIGS. 15 and 16, the crimping station 26 includes nine crimpers shown generally at 150 so that the welds in three cell positions can be simultaneously crimped. The crimpers 150 are attached to a plate member 152 which is mounted for slidable movement relative to the battery container by rods 154, 154', mounted in bearing blocks 156, 156'. Air cylinder 158 moves the crimpers into position in the battery container, upon actuation by the master control means through standard connections, adjustable stop means (not shown) being provided to insure the crimpers are in proper position.

Figure 17:
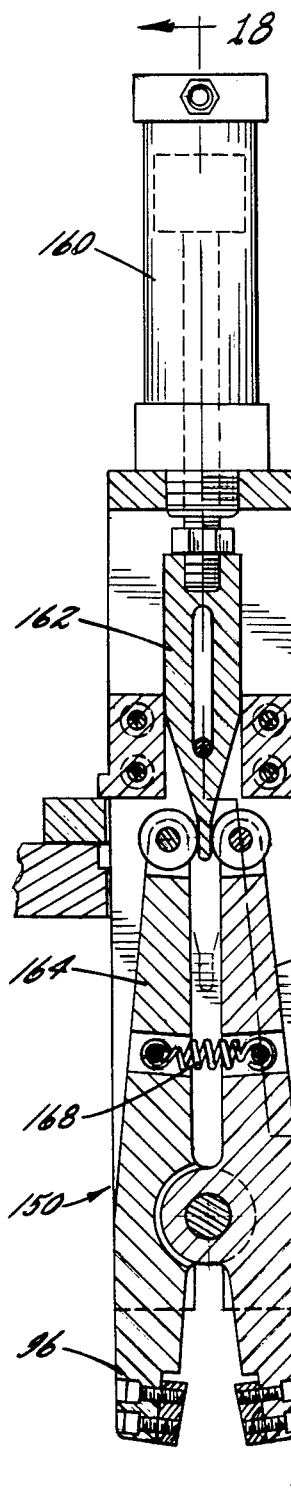
FIG. 17 is a cross-sectional view taken generally along the line 17—17 of FIG. 18 and illustrating a pair of crimper heads in an open position.
Figure 18:
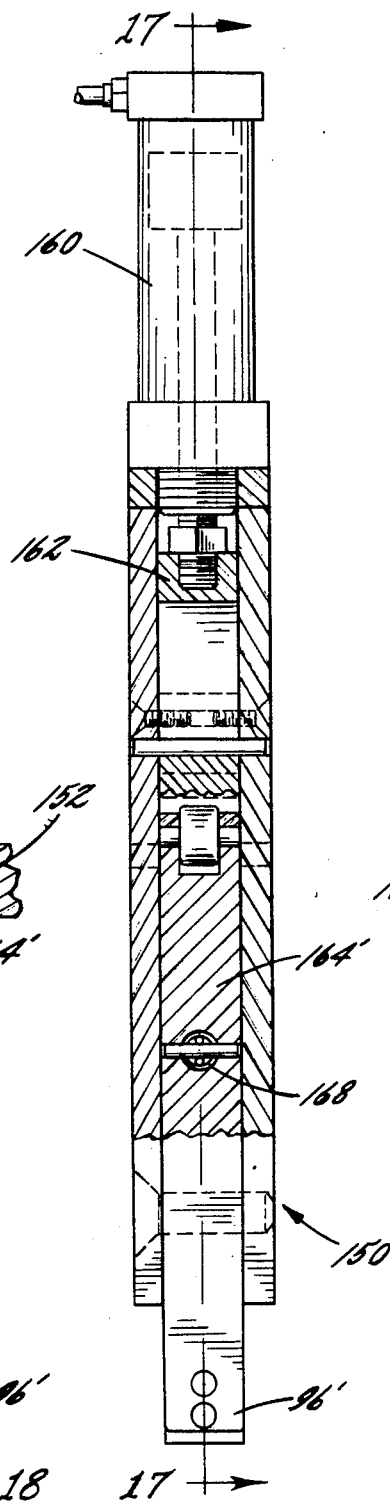
FIG. 18 is a cross-sectional view taken generally along the line 18—18 of FIG. 17 and further showing the crimper heads.
Figure 19:
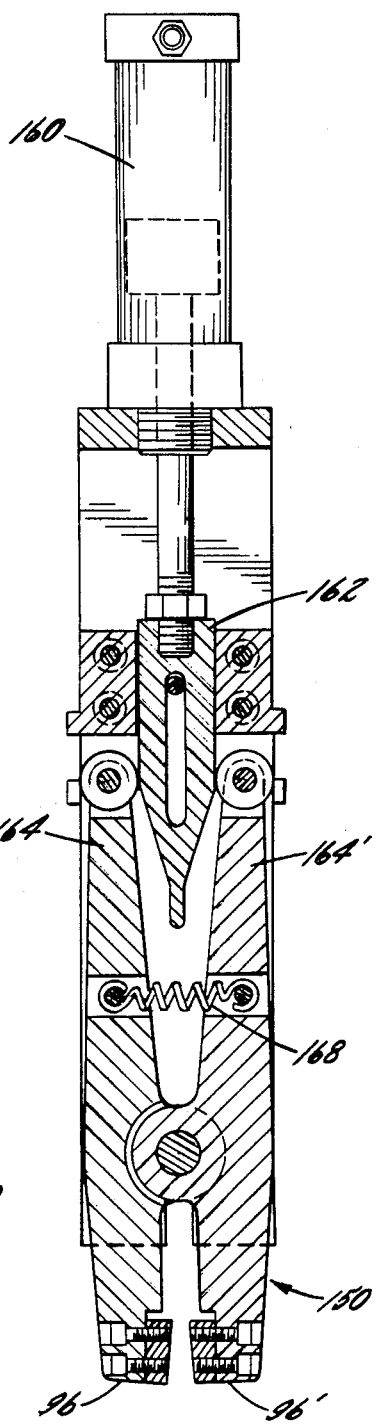
FIG. 19 is a cross-sectional view similar to FIG. 17, except showing the crimper heads in their closed position.

After reaching the desired alignment in the battery container, the crimping action is effected by a hydraulic cylinder 160 driving member 162 downward, forcing the leg members 164, 164' of each crimper 150 outwardly and crimper heads 96, 96' inwardly, as can be seen from FIGS. 17 and 19. Springs 168 may be employed to assist in returning crimper heads 166, 166' to the open position shown in FIG. 17. Return of the crimpers to the retracted position shown in FIG. 15 may be effected by a spring (not shown) located in cylinder 160. The type of crimping operation shown is similar to that sometimes used in the intercell welding of conventional batteries.

In accordance with yet another aspect of the present invention, as has been previously mentioned, a control means is provided which coordinates the entire operation of the welding and, when employed, the crimping, apparatus. In general, the control means comprises a master control means and slave control means associated with each welding station. Preferably, the master control means comprises a microprocessor based programmable controller. Any microprocessor based programmable controller capable of controlling the apparatus to provide the operation sequence set forth herein may be employed. Many such controllers are commercially available. A suitable controller of this type is a Gould Modicon 484 Programmable Controller, which is commercially available. The master microprocessor controller is connected to slave control means at the various welding stations by suitable interface means, as well as to the various operational elements of the apparatus, some of which have been previously described. In addition, the master microprocessor controller is connected to a manually operated, operator station. This system of controls not only allows the conditions for each weld to be those predetermined to be satisfactory but also allows an operator the ability to adjust the welding conditions should this become desirable during operation. Moreover, with such control means, the apparatus is amenable to incorporation of a weld testing means to provide an on stream method of insuring that the intercell connections made are satisfactory.

Several means for testing welds are known and may be employed, as desired. For example, it may be useful to test the weld, based upon the spatial separation of the electrodes using a conventional LVDT device (linear variable differential transformer). As shown in FIG. 12, a LVDT device 167 can be employed to generate a signal to the control means so that, as one example, the welding operation is continued until a predetermined electrode separation considered to provide a satisfactory weld is reached. Alternatively, the weld test means could be used as a method of accepting or rejecting batteries through utilization of the control means.

FIG. 20 schematically illustrates the overall control system. As shown, the master control means comprises a Gould Modicon 484 Programmable Controller 168 having a processor portion 170 and a memory portion 172 which function in a conventional manner to control the operational elements of the present invention in the sequences which will be described hereinafter. Master controller 168 communicates with such operational elements through suitable input and output modules of conventional construction.

Each welding station has associated therewith a slave controller 174, a commercially available Technitron welder control being suitable. Any controller compatible with the master controller, through a suitable interface or directly, may be used which has the ability to read the weld parameter signals from the master controller and to control the welding operation as described herein. Suitable controllers in addition to the exemplary Technitron unit are commercially available. Master controller 168 is connected to each slave controller 174 via line 176 which carries a multiplex, digital signal that includes the time or cycle information and interface 178 having a conventional tri-state buffered latch and an inverter for providing compatibility between the master control means and the slave controller. Only the information applicable to the particular welding station is taken from the multiplex signal, as may be accomplished by known techniques. Lines 180, 180' and 180" connect master controller with the slave controllers 174 at each welding station to allow an analog signal that conveys the weld current information.

Master controller 168 is likewise connected to the control portion 182 of slave controllers 174 via lines 184, 186 and 188 to allow a signal to such control portion to initiate the welding operation and, as well, a signal to the master controller when the operation is complete. The control portion 182 thus functions to turn the power supply for the welding on and off pursuant to the parameters provided by master controller 168.

In addition, an operator station 190 of conventional design is provided which is connected to master controller 168 via lines 192 and 194. This allows an operator to manually vary the weld parameters being used, if such is needed, after all the welds in a particular partition have been completed. The operator station includes visual displays of the current level and cycles for each of the electrode pairs. Master controller 168 is also connected to the crimper station by standard machine connection, as shown at 196.

Considering the overall machine sequence, the transporting of battery containers through the apparatus is controlled by the master control means as follows. Unless otherwise indicated herein, the master control means are connected to the various operational elements of the apparatus through standard machine connections. With the conveyor having been started up, the master control means in a timed sequence causes the stop means to rotate into position, activates the aligning means (after a wait period adequate to allow the containers to reach the next position so as to retain the containers in such position) and then stops the conveyor motor. The photoeyes then sense whether the battery containers at the respective stations are each in their proper location. This sequence occurs at each welding and crimping station essentially simultaneously. If the containers have been sensed as being properly located, the respective welding and crimping heads are caused to be lowered to their operational position.

The welding and crimping sequences are then carried out. After completion of these steps, the heads are raised to their retracted position, generating a signal to the master controller. If the retracted, up position signal is not received, the entire apparatus will be shut down; and a control light or alarm may be provided to alert the operator. When the heads have been identified as being in the retracted position, the aligning means are retracted, the machine direction stop means are rotated to the next sequence, the conveyor motor is started, a waiting period again being provided to allow the containers to reach the next position. The sequence is then repeated.

In the above sequence, if the presence of a battery container is not detected, the operation at that station will not proceed. Each station operates independently of one another so that the absence of a container at one station only disables the function at that particular station, except at the first position of weld station No. 1 as will be described hereinafter. The disabling is achieved by the master controller generating a waiting period and a cycle complete.

The principal purpose of avoiding initiation of the welding or crimping sequence if a battery container is not properly aligned is simply to prevent damage to either the container itself or to the apparatus, but more usually to the container. Thus, for example, a misaligned container could result in the welding heads deforming the container as the heads are lowered so that the container itself would have to be scraped. This is, however, primarily a safety factor. Once a battery container reaches the proper position in the initial position of the first welding station, there is little likelihood that any problems in the container being misaligned downstream will in fact occur.

However, it is more difficult to control entry into the welding apparatus so that in-line feeding problems can cause a battery container to not reach the initial station in a timely fashion. Accordingly, pursuant to one aspect of the present invention, the microprocessor controller is preferably programmed to inactivate the downstream welding and crimping stations when the container reaches the initial position in the first welding station too late to be sensed as being properly located. Thus, if any in-feeding problems occur, the container will not be only partially welded. Rather, the microprocessor controller is programmed to, in effect, generate cycle complete signals as that late container proceeds through the apparatus. This avoids interruption of the machine sequence to manually operate a particular station to complete a partially processed battery. While such an operation certainly could be done, or, indeed, the necessary welds completed in a manual fashion, this would detract from the production rates that could otherwise be achieved. Late containers can be returned to the feeding sequence, manually or otherwise.

With regard to the welding sequence, after the master controller receives a signal that a battery is present, this controller transmits the welding parameter information to the slave controllers for the welding stations as has been described in conjunction with FIG. 20. Inasmuch as conditions of the lugs being welded can vary (e.g.—the time between the casting of the strap and the intercell welding), necessitating changes in the current and time needed to effect a satisfactory weld, it is preferred to carry out the welding sequence with what may be termed a pre-heat or pre-weld cycle, followed by the welding cycle.

Accordingly, in the preferred embodiment, after sensing that the battery container is in proper position, the initial information transmitted by the master controller to the slave controllers is the pre-heat time and current information for the initial weld. In general, the pre-heat cycle softens the lugs so as to allow the electrode tips to readily penetrate the lugs during welding, regardless of their initial hardness. After transmission, a waiting period is provided to allow satisfactory time for the welding electrode heads to close. At this point, the master controller signals the control portion of the slave controller to start the pre-heat cycle. Completion of the pre-heat step is then transmitted by such control portion to the master controller. If the pre-heat signal complete is not received, no further operational sequences will be initiated; rather, the apparatus will go into a waiting sequence until an operator can correct whatever malfunction may have occurred.

After the master controller receives the pre-heat complete signal, the master controller then transmits to the slave controller the weld parameter information for such first weld. The master controller likewise then signals the control portion of the slave controller to start the welding cycle. The slave controller signals the master controller when the weld cycle is complete. If no such signal is received, the apparatus will go into a wait cycle, as previously discussed.

At this time, the master controller then transmits to the slave controller the pre-heat cycle information for the second weld, and the sequence is then repeated. This is then repeated for, when used, the third or further welds, after which time the master controller initiates the sequence described above to index the containers to the next position.

In accordance with yet another aspect of the present invention, means are provided to allow the welding sequence to be altered without having to modify the programming of the master controller. To this end, the master controller provides to the slave controllers the time parameter (cycles) for the pre-heat and weld cycles in the form of a digital signal while the current level is represented by an analog signal. This allows the current level to be modified, in effect, circumventing the slave controller if it is desired to modify this parameter so as to alter the welding conditions when needed. This can be achieved, for example, by an operator manually modifying the current level by adjustment at the operator station for the particular welding heads desired.

The illustrative embodiment provides an intercell welding system which, despite the relatively large number of intercell connections being made in comparison to conventional batteries, is capable of operating at a production rate sufficient to match the requirements of downstream battery processing, such as the sealing of the battery cover to the container. More specifically, the intercell welding apparatus of the present invention in the configuration herein described is capable of providing a welded battery approximately every 20 seconds. Other configurations may vary the timing as desired. The particular pre-heat and weld cycle parameters may vary within wide limits depending upon the specific battery construction. Suitable parameters may be readily determined, as is well known. The entire pre-heat (when used) and weld cycle may be carried out in less than one second. If desired, the number of welding and crimping stations can be increased which may facilitate even further the production rate. However, the increased production rate may not justify the additional capital expense required.

Whatever welding sequence is utilized, it is useful to provide means which allow the individual welding parameters to be varied at each weld so that compensation for changing conditions, if needed, can be readily provided.

We claim:

1. An apparatus for welding through-the-partition intercell connections in a lead-acid battery container having partitions dividing the container into a plurality of cells, each partition having a plurality of spaced apertures therein for making such intercell connections, and elements in each cell having spaced lugs abutting each aperture, said apparatus comprising:

(a) at least one welding station having a plurality of welding heads corresponding in number and spaced similarly to the apertures in a single partition;

(b) conveying means for moving battery containers through said welding station;

(c) aligning and retaining means for positioning a battery container in at least one predetermined position in said welding station relative to said welding heads;

(d) sensing means for determining the presence of a battery container at said predetermined position;

(e) means for moving the battery container and welding heads relative to each other at said station such that the heads are brought into adjacent relation to the lugs abutting the apertures in said single partition;

(f) said welding heads having means for welding the lugs abutting the apertures of the single partition through said apertures;

(g) master control means for controlling the means identified in subparagraphs (a) through (f) in accordance with a predetermined sequence; and (h) slave control means at said welding station capable of receiving welding instructions from said master control means, operating said welding means pursuant to said instructions and signaling said master control means when welding has been completed.

2. The apparatus of claim 1, which includes means connected to said master control means capable of modifying the welding instructions provided to said slave control means.

3. The apparatus of claim 1, which includes a crimper station having crimping means for mechanically crimping the lugs welded at said welding station, said crimping station being located relative to said welding station such that said conveying means moves said battery containers to said crimping station after said containers pass through said welding station and means at said crimper station capable of moving said crimping means and a battery container at said crimper station back and forth relative to each other from an inoperative position to an operative position for crimping welded lugs, said master control means controlling the operation at said crimper station in response to a predetermined sequence.

4. The apparatus of claim 3, which includes aligning and retaining means for positioning a battery container in a predetermined position in said crimper station and retaining said battery container in said predetermined position during crimping and sensing means for determining the presence of a battery container at said predetermined position.

5. The apparatus of claim 4, wherein said master control means initiates, when battery containers are in said predetermined positions, the welding and crimping at substantially the same time.

6. The apparatus of claim 1, wherein said welding heads each includes means for displacing portions of opposed lugs inwardly into contact with each other in the respective aperture of said single cell partition positioned therebetween and means for controlling the displacement of portions of said opposed lugs into the apertures of said single partition to substantially the same extent.

7. The apparatus of claim 1, wherein said master control heads causes said welding means to perform a predetermined pre-heat cycle prior to a welding cycle.

8. The apparatus of claim 1, wherein said master control means provides welding instructions to said slave control means by at least two separate signals.

9. The apparatus of claim 1, wherein said welding heads are moved into an operative position for welding at substantially the same time and said master control means causes a predetermined welding cycle to be carried out by each of said separate welding means in a sequential fashion.

10. The apparatus of claim 1, which includes at least three separate welding stations located adjacent one another and a separate slave control means at each station.

11. The apparatus of claim 10, wherein there are three welding stations, said conveying means sequentially transporting a battery container from a first welding station to the adjacent two welding stations, said aligning and retaining means being capable of locating a battery container in a first and a second predetermined position at each of said welding stations, and said sensing means being capable of determining the presence of a battery container at each of the two predetermined positions at each welding station.

12. The apparatus of claim 11, wherein each partition has three apertures, each of said welding stations includes three separate welding heads, each of said separate welding heads being located so as to be capable of effecting an intercell connection through one of the partition apertures.

13. The apparatus of claim 12, wherein said master control means causes said welding heads to move into the operative position at substantially the same time and causes a predetermined welding cycle at each station to be carried out by each of said separate welding heads in a sequential fashion.

14. The apparatus of claim 13, wherein the second predetermined position at each station is spaced from the first predetermined position by at least the width of one cell of the battery container.

15. The apparatus of claim 14, wherein said second predetermined position is spaced from said first predetermined position about the width of one cell of the battery container.

16. The apparatus of claim 15, wherein said master control means causes a welding cycle at said second predetermined position of said first welding station and at the other welding stations to not function when a battery container not sensed to be in the first predetermined position of said first welding station reaches said second predetermined position of said first welding station and said other welding stations.

17. An apparatus for welding multiple through-the-partition intercell connections in a lead-acid battery container having partitions dividing the container into a plurality of cells, each partition having at least two spaced apertures therein for making such intercell connections, and each battery element in adjoining cells having spaced lugs abutting each aperture, said connections being made by fusing said lugs through said apertures, said apparatus comprising:

(a) a welding means including pairs of opposed welding electrodes, said electrode pairs corresponding in number and being spaced similarly to the apertures in a single partition;

(b) said electrodes of each pair being selectively movable into operative relation to respective pairs of lugs abutting the apertures in said single partition; and (c) means for moving said electrodes of each pair inwardly relative to each other for moving said lugs into electrical contact in the respective apertures of said single partition and for passing an electric current through said electrodes to weld and fuse said lugs within said apertures, thereby effecting said multiple intercell connections through said single partition.

18. An apparatus for welding multiple through-the-partition intercell connections as set forth in claim 17, wherein the electrodes of each pair are adapted to fit about the lugs abutting said respective apertures and are configured and dimensioned relative to said apertures to cause a portion of said lugs to be displaced into said apertures upon inward movement of said electrodes relative to one another.

19. An apparatus for welding multiple through-the-partition intercell connections as set forth in claim 17, wherein said means for moving said electrodes inwardly relative to each other is capable of effecting the multiple intercell connections through a single partition in a sequential fashion.

20. An apparatus for making multiple through-the-partition intercell connections in a lead-acid battery container having partitions dividing the container into a plurality of cells, each partition having a plurality of spaced apertures therein for making such intercell connections, and battery elements in each cell having spaced lugs abutting each aperture, said connections being made by fusing the lugs through said apertures, the apparatus comprising:

(a) a welding assembly comprising a plurality of sets of multiple opposed electrodes equal in number and spaced similarly to the spaced apertures in a single partition and said electrodes being adapted to fit about said lugs to be fused, said electrodes being configured and dimensioned relative to said apertures to cause a portion of said lugs to be displaced into said apertures upon inward movement of said electrodes relative to one another;

(b) means for moving said plurality of sets of electrodes and said battery container relative to each other such that said sets of electrodes are simultaneously positioned in operative relation to the respective lugs abutting the apertures of said single partition; and (c) means for moving the electrodes of each set relatively toward each other for bringing said lugs into position for passing an electric current through said electrodes for fusing portions of the lugs in the apertures and forming multiple intercell connections between battery elements in adjacent cells.

21. A method for welding through-the-partition intercell connections in a lead-acid battery container having partitions dividing the container into a plurality of cells, each partition having at least two spaced apertures therein for making such intercell connections, and elements in each cell having spaced lugs abutting each aperture, said method comprising:

(a) providing at least one welding station having a plurality of welding heads corresponding in number to the number of apertures in a single partition of said battery container and being capable of welding lugs abutting the respective apertures of said single partition through said apertures;

(b) conveying a battery container to the welding station;

(c) aligning and retaining the battery container in at least one predetermined position in the welding station;

(d) sensing the presence of a battery container at said predetermined position;

(e) welding adjacent lugs together through each of the apertures of said single partition while said battery container is at said welding station;

(f) conveying said battery container away from said welding station following welding; and (g) controlling the steps identified in subparagraphs (a) through (f) in accordance with a predetermined sequence by a master control.

22. A method for welding through-the-partition intercell connections in a lead-acid battery container having partitions dividing the container into a plurality of cells, each partition having at least a first and second spaced aperture therein for making such intercell connections, and elements in each cell having spaced lugs abutting each aperture, said method comprising:

(a) positioning a container at a welding station having means for fusing and welding the lugs adjacent said first and second apertures in a single partition to form intercell connections while said container is positioned at said station, (b) moving at least a portion of said lugs adjacent said first aperture into electrical contact for fusion within said first aperture;

(c) passing an electrical current through said lugs to fuse said lug portions within said first aperture to effect an intercell connection through-the-partition;

(d) moving at least a portion of said lugs adjacent said second aperture into electrical contact for fusion within said second aperture;

(e) passing an electric current through said lugs to fuse said lug portions within said second aperture to effect an intercell through-the-partition; and (f) conveying said container away from said welding station following completion of welding and fusion of said lugs in said first and second apertures of said single partition.

* * * * *